HIGH PERFORMANCE AMPLIDYNE SERVOMECHANISM

Filed Feb. 7, 1946

INVENTORS
NEWTON E. WARD
WILLIAM MERSMAN
ROBERT W. MAYER

BY M. O. Hayes

ATTORNEY

Patented July 29, 1952

2,605,451

UNITED STATES PATENT OFFICE 2,605,451

HIGH PERFORMANCE AMPLIDYNE SERVOMECHANISM

Newton E. Ward, Cambridge, Mass., Robert W. Mayer, Schenectady, N. Y., and William Mersman, Davis, Calif., assignors, by mesne assignments, to the United States of America as represented by the Secretary of the Navy Application February 7, 1946, Serial No. 646,162

5 Claims. (Cl. 318—30)

This invention relates to a servomechanism and more particularly, to a servomechanism having a high degree of stability and low magnitude of error.

A servomechanism is a means by which an arbitrary angular motion imparted to a first control shaft can be reproduced accurately and with amplified torque by the motion of a second load shaft, and in which the system constantly tends to reduce the error to zero, the error being the difference between the angular position of the control shaft and that of the load shaft.

Since a servomechanism includes elements having time lags, the overall system has a natural period of oscillation, or exhibits resonance properties. This introduces a problem of stabilization in which the power amplification of the system must be low at a frequency corresponding to that of resonance but high at other frequencies to produce accurate reproduction of motion by the load shaft when the control shaft is turned with high angular velocity or with rapid angular acceleration.

Conventional servomechanisms incorporate either a band-rejection filter network in the "forward" or signal channel or a high-pass filter network in a degenerative feedback circuit of an amplifier in the servomechanism to achieve stability. Either method produces satisfactory results when low angular velocities and accelerations are involved, but the error increases rapidly as these parameters increase. An increase in the amplification of the system under these conditions decreases the error, but increasing the amplification above a certain level results in oscillation of the system at its resonant frequency.

It is an object of this invention to provide improved means for stabilizing a servomechanism. In accordance with this invention it is contemplated that this stabilization will be accomplished by the combination of a band-rejection filter network in the signal channel and a high-pass filter network in the feedback channel of an amplifier in the servomechanism.

It is a further object of this invention to provide in a servomechanism means for increasing the accuracy of reproduction of motion by the load shaft when the control shaft is moved with high angular velocity and/or high angular acceleration.

These and other objects will be more apparent upon consideration of the following description and accompanying drawings, in which.

Figure 1:
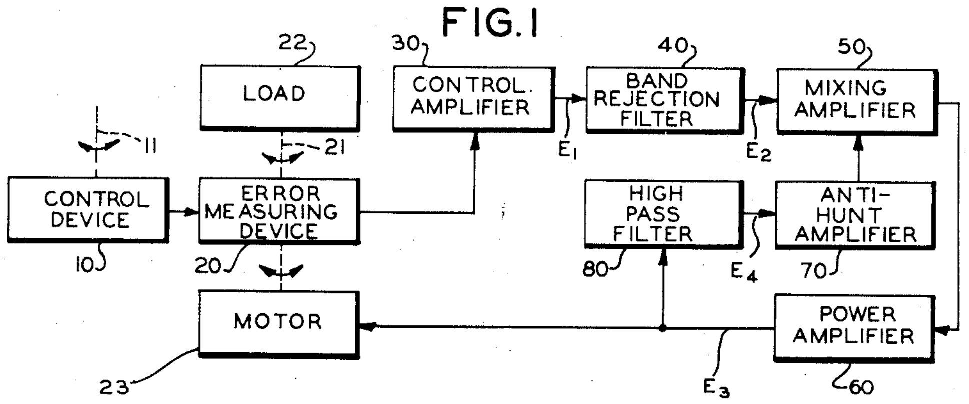
Fig. 1 is a functional block diagram of a servomechanism incorporating an embodiment of this invention.

Specifically, with reference to Fig. 1, the output of a control device 10 such as a synchro transmitter, having a shaft 11, is electrically connected to the input of an error measuring device 20, such as a synchro receiver. The synchro receiver 20 is usually mechanically connected to a load 22 by means of a common load shaft 21. A reversible direct current motor 23 is mechanically connected to the load shaft, usually through a system of gears (not shown).

Angular displacement of the control shaft 11 with respect to the load shaft 21 results in the production of an alternating error voltage across the output terminals of the synchro receiver 20, the amplitude and phase of the error voltage being a function of the amount and direction of the displacement respectively. The error voltage is impressed across the input terminals of the control amplifier 30 which includes a voltage amplifier, a phase detector, and a power amplifier having a low output impedance. The output of the control amplifier is a pulsating unidirectional voltage $E_1$ having a polarity dependent upon the phase of the error voltage with respect to the phase of a reference voltage impressed across the rotor winding of the synchro transmitter, and an amplitude which is a function of the amount of displacement.

Figure 2:
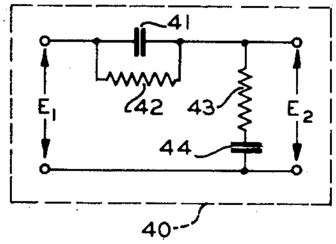
Fig. 2 is a schematic diagram of a band-rejection filter network.
Figure 4:
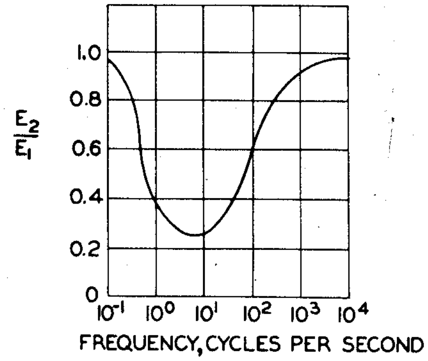
Fig. 4 is a graph of the frequency response characteristic of a typical band-rejection filter network, as for example, that shown in Fig. 2.

The output terminals of the control amplifier 30 are connected to the input terminals of a band-rejection filter network 40, shown schematically in Fig. 2. The values of the resistors 42 and 43 and the capacitors 41 and 44 are so selected that the ratio of the output voltage $E_2$ to the input voltage $E_1$ is lowest at a frequency approximately equal to that of the resonant frequency of the overall servomechanism. The frequency response characteristic of a band-rejection network 40 having typical circuit constants is shown in Fig. 4.

The output terminals of the band-rejection filter network 40 are connected to the first input terminals of the mixing amplifier 50, the output of which excites the control field of a direct-current rotating machine power amplifier 60, such as an amplidyne. The power amplifier output $E_3$ excites the direct current motor 23, which is mechanically connected to the error measuring synchro receiver 20 and the load 22.

Figure 3:
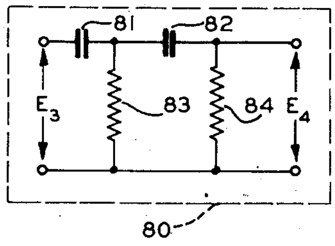
Fig. 3 is a schematic diagram of a high-pass filter network.

The power amplifier output $E_3$ is also impressed upon the input terminals of a high-pass filter network 80 shown schematically in Fig. 3, the output voltage $E_4$ of which is amplified by an anti-hunt amplifier 70 and is impressed upon a second input of the mixing amplifier 50 in such a way as to form a degenerative feedback circuit.

Figure 5:
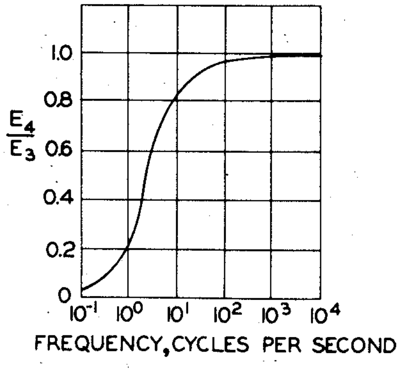
Fig. 5 is a graph of the frequency response characteristic of a typical high-pass filter network as shown in Fig. 3.

The values of the resistors 83 and 84 and capacitors 81 and 82 are so chosen that the degenerative feedback is zero at zero frequency and increases to an appreciable degree at a frequency corresponding to the natural resonant frequency of the servomechanism. Variation of the ratio of the output voltage $E_4$ to the input voltage $E_3$ with respect to frequency of a representative high-pass filter network 80 having typical component values is shown graphically in Fig. 5. Since the high-pass filter network forms a part of an inverse feedback circuit, the amplification of the mixing amplifier-power amplifier combination will be greatest at a very low frequency and will decrease as the frequency increases.

By the use of the combination of the band-rejection filter network 40 and the high-pass filter network 80, the servomechanism can be stabilized so that it has a ratio of steady state velocity in degrees per second to error in degrees of approximately 5000 and a ratio of steady state acceleration in degrees per second per second to error in degrees caused by this acceleration of approximately 1000.

Since certain changes may be made in the above described servomechanism and different embodiments of the invention could be made without departing from the scope thereof, it is intended that all matter contained in the above description or shown in the accompanying drawings shall be interpreted as illustrative and not in a limiting sense, and therefore, that the invention is to be limited only by the prior art and the spirit of the appended claims.

What is claimed is:

1. A servomechanism comprising, a direct current motor, a synchro transmitter for producing a signal for controlling the operation of said motor, a synchro receiver mechanically connected to the shaft of said motor for producing an error signal, said error signal being a measure of the error between said synchro transmitter and said synchro receiver and having a magnitude and phase dependent upon the magnitude and direction of said error, a control amplifier including a phase detector for determining the direction of said error, said control amplifier having a low impedance output, a band-rejection filter network connected to the output of said control amplifier for attenuating frequencies near the resonant frequency of the servomechanism, a mixing amplifier having a first input connected to the output of said band-rejection filter, a rotating machine power amplifier having a control winding connected to the output of said mixing amplifier, the output of said power amplifier energizing said motor and being connected to the input of a high-pass filter network for attenuating low frequencies, an anti-hunt amplifier having its input connected to the output of said high-pass filter network and having its output connected to a second input of said mixing amplifier, said high-pass filter network in combination with said anti-hunt amplifier forming a degenerative feedback circuit operative upon said mixing amplifier, said feedback circuit in combination with said band-rejection filter network providing stabilization for said servomechanism and increasing the response of said motor to rapid changes in said controlling signal from said synchro transmitter.

2. The apparatus of claim 1, in which said band-rejection filter network comprises, first and second input and output terminals, a parallel network of a resistor and a capacitor connected between said first input and first output terminals, an electrical connection between said second input and second output terminals, and a series network of a resistor and a capacitor connected between said first and second output terminals, said input terminals being energized by the low-impedance output of said control amplifier, said output terminals energizing the first input of said mixing amplifier, and in which said high-pass filter network comprises, first and second input and output terminals, first and second capacitors connected in series between said first input and first output terminals, a first resistor connected at one end between said capacitors and at the other end to said second input and second output terminals, and a second resistor connected between said first and second output terminals, said input terminals being energized by the output of said power amplifier and said output terminals energizing the input of said anti-hunt amplifier.

3. A servomechanism for controlling the angular position of an output shaft in reponse to the angular position of an input shaft, comprising a motor adapted to drive said output shaft, means to generate an error signal varying as a function of the difference in said angular positions, means to convert said error signal to a unidirectional signal varying in amount and polarity as a function of said error signal, a band rejection filter for attenuating frequencies in the region of the resonant frequency of said servomechanism, a power amplifier for energizing said motor, connections for feeding said unidirectional signal to said power amplifier through said band rejection filter, and a high pass filter network connected between the output and input circuits of said power amplifier as a degenerative feedback circuit, said high pass filter being adapted to have a maximum output in the region of the resonant frequency of said servomechanism.

4. A servomechanism for controlling the angular position of an output shaft in response to the angular position of an input shaft comprising, a motor adapted to drive said output shaft, means to generate an error signal varying in amount and phase with the magnitude and direction respectively of the difference in said angular positions, means to convert said error signal to a unidirectional signal whose amount and polarity vary respectively with the amount and phase of said error signal, a band rejection filter for attenuating frequencies near the resonant frequency of said servomechanism, a power amplifier for energizing said motor, connections for feeding said unidirectional signal to said power amplifier through said band rejection filter, and a high pass filter network connected between the output and input circuits of said power amplifier as a degenerative feedback circuit, said high pass filter being adapted to have a maximum output in the region of the resonant frequencies of said servomechanism.

5. A servomechanism for controlling the angular position output shaft in response to the angular position of an input shaft comprising, a motor adapted to drive said output shaft, means to generate an error signal varying in amount and phase with the magnitude and direction respectively of the difference in said angular positions, a control amplifier including a phase sensitive detector to convert said error signal to a unidirectional signal whose amount and polarity vary respectively with the amount and phase of said error signal, a band rejection filter connected to the output of said control amplifier for attenuating frequencies in the region of the resonant frequency of said servomechanism, a power amplifier responsive to said filtered unidirectional signal for energizing said motor, and a high pass filter network connected between the output and input circuits of said power amplifier as a degenerative feedback circuit, said high pass filter being adapted to have a maximum output in the region of the resonant frequency of said servomechanism.

NEWTON E. WARD.
ROBERT W. MAYER.
WILLIAM MERSMAN.

REFERENCES CITED

The following references are of record in the file of this patent:

UNITED STATES PATENTS

| Number | Name | Date |
|---|---|---|
| 2,406,143 | Godet | Aug. 20, 1946 |
| 2,407,084 | Lavender | Sept. 3, 1946 |